Nov. 13, 1962    R. C. READ    3,063,699
MOBILE APPARATUS FOR LANCING MOLTEN MIXTURES
Filed Dec. 1, 1960    2 Sheets-Sheet 1

INVENTOR.
ROBERT C. READ
BY John P. Chandler
HIS ATTORNEY.

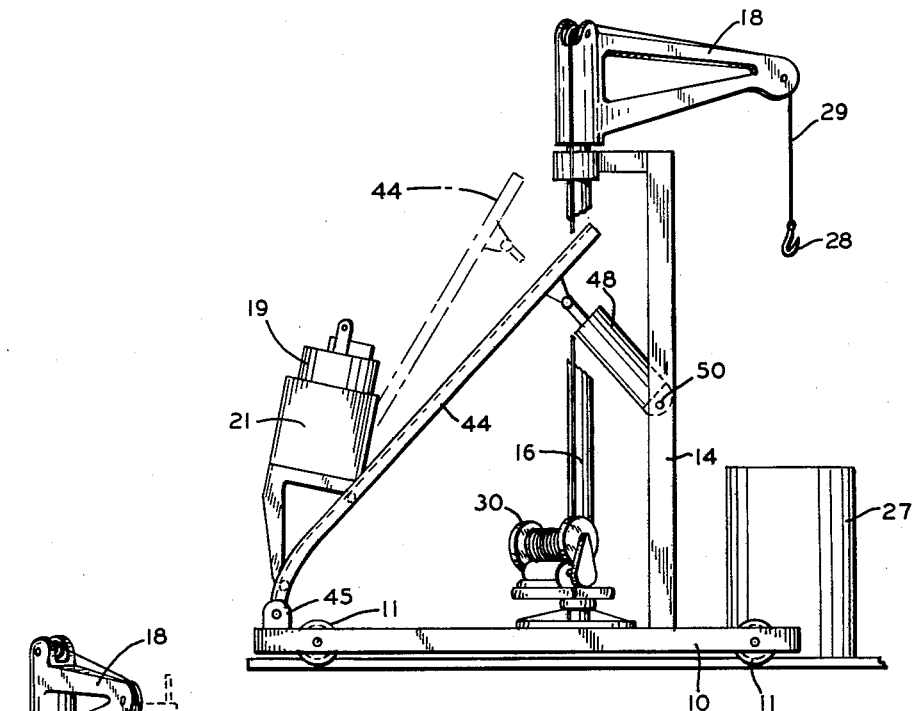
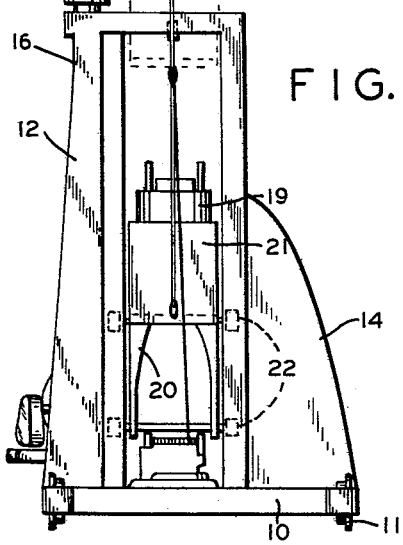

United States Patent Office 3,063,699
Patented Nov. 13, 1962

3,063,699
MOBILE APPARATUS FOR LANCING MOLTEN
MIXTURES
Robert C. Read, 197 Westport Ave., Norwalk, Conn.
Filed Dec. 1, 1960, Ser. No. 72,978
3 Claims. (Cl. 266—34)

This invention relates to the treatment of molten ferrous metals, such as when certain desulphurization processes are undertaken, and relates more particularly to a novel means for the safe, convenient and controlled introduction of liquid materials, heated to a high temperature, into molten iron or steel in furnaces, or other containers. As the available ore becomes of progressively lower grade, the problem of the desulphurization and other purifying processes related to the manufacture of ferrous metals takes on increasing importance, since sulphur and other impurities in any substantial amount impart undesirable qualities to the iron and, particularly, to ferrous alloys such as the stainless steels.

For instance there is, among the many suggested methods of desulphurizing iron and steel, one which requires the introduction of a carefully predetermined quantity of a molten mixture of caustic soda and adjuvant into the body of the molten ferrous metal in the furnace or ladle, below the surface thereof and most preferably near the lower bottom and at or near the center of the furnace or ladle. The added mixture is thus able to diffuse throughout the molten metal in order to react with the sulphur and form inert removable products which go into the slag. This method has been proven to be much more effective than pouring the steel through several different slags containing solid or powdered caustic soda and other desulphurizing agents.

An important object of the present invention is to provide an apparatus for effectively carrying out the foregoing process which, like other processes used in this industry, is made doubly difficult by the fact that the caustic mixture can only be introduced into the body of the molten ferrous bath in furnaces through the standard small side wall or roof openings near the side walls, by means of a lance which necessarily must be positioned or that the lance enters at a steep angle, which must be accurately maintained, in order to enable its lower end to come to a halt in a small area near the center of the bottom.

The combination of the present invention includes a novel chassis and superstructure with means for supporting a removable receptacle or capsule of a size to contain the maximum required charge of the molten desulphurizing or other processing agent which is connected directly and rigidly with the angularly positioned lance, the capsule support comprising a car movable down an inclined trackway which may be of variable angularity. The carriage with its superstructure is movable over the floor area adjacent to the furnace and is therefore ideally adapted for moving it to an adjoining location where the capsule can be charged with the processing mixture, the capsule being provided with heating means so as to get the contained mixture into a molten state, and with a permanent insulated covering, out of which it can be lifted when the time comes to go ahead with the processing. In view of the design and strength of its carriage and superstructure, the capsule can be of such size and capacity as to permit handling all of the molten desulphurizing mixture needed for a single furnace melt in one operation, thus avoiding using two or more similar applications, which would be relatively ineffective but necessary to keep down to any size and weight of capsule that could be handled and directed manually, or by an overhead crane.

A further object of the invention is to provide a system for handling these dangerous molten mixtures and to introduce them into a furnace without danger of life or limb since with this invention, the operator need not be exposed or enter areas where spillage could occur, and the lance itself is safely supported and rigidly attached to the charging capsule. Separate driving means may be provided for moving the superstructure, and is provided for lifting and swinging the capsule into position, and for raising and lowering the car with the capsule and its attached lance, and all of these drives may be remotely and separately controlled.

The arrangement of the present invention also completely eliminates any dangerous flexible connections, liable to leak or fail, between the capsule holding the molten material and the point of eventual discharge thereof into the melt at precisely the point where it will do the most effective work.

This arrangement is designed to be safely operated with a minimum of personnel, since all operations can be motor driven. Because of the rigidity of the controlling structures extreme accuracy of positioning can be achieved, quickly and without effort, by a single operator.

A further feature of this equipment is the positioning of the crane, which is used to transfer the capsule back and forth from the permanent insulated covering or preheat pit, where it rests while the processing mixture is being heated to high temperature, to the mobile car on the inclined tank; the crane being positioned in such a way that it is halted by stops at either end of its arc of swing. At the rearward end of its swing its lifting cable and attachment hook are centered directly over the capsule when in its permanent pre-heat pit. At the forward end of its swing they are centered directly over the mobile car in its lowermost position on the inclined track. This permits lifting the capsule with its contained molten processing additive out of the pit and swinging it around the side of the superstructure until the crane's swing is halted by the stop at the forward end of the arc, whereupon the capsule may be lowered directly into the waiting car, above which it is now centered, without further positioning. The motions are reversed when the time comes to transfer the emptied capsule from the car back to the permanent pre-heat pit for recharging with additive material to be melted for the next lancing operation; this time, the crane's swing is halted in the proper position by the stop at the rearward end of its arc.

It will be obvious that the crane also can be used to lift heavy containers of cold charging material above the empty capsule when it is at rest within its insulated pre-heat pit and, with the employment of any attachment designed for the purpose, these heavy containers can then be easily and safely tipped so that the required quantity of additive will be poured into the capsule.

In the drawings:

FIG. 3 is similar to FIG. 1 but shows the trackway for the capsule support at a diffferent angle and means for adjusting this angle.

FIG. 4 is a rear end elevation of the structure of FIG. 1 looking toward the furnace.

Figure 1:
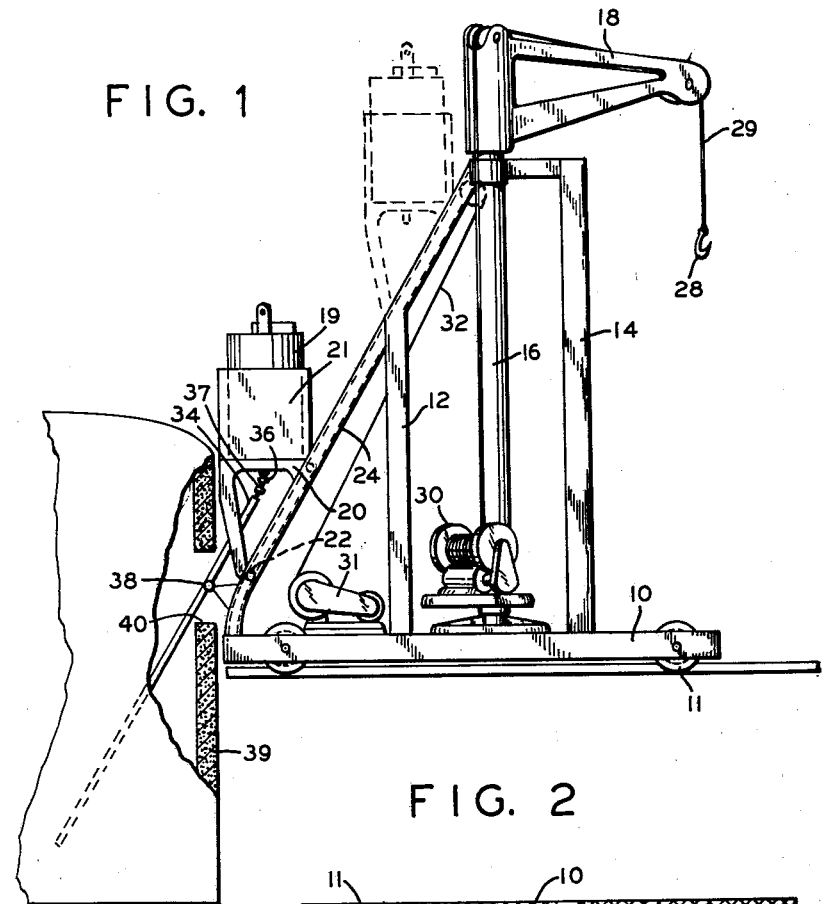
FIG. 1 is a side elevation of the apparatus of the present invention and showing the furnace broken away at the point where the lance enters the wall opening, here shown is the side wall.

The apparatus of the present invention includes a mobile unit having a base or chassis 10, provided with flanged wheels 11 and a plurality of vertical braces 12 and 14 for supporting a mast 16 for a crane provided with a boom 18.

The charging capsule 19 is supported in a car 20 having a capsule-receiving receptacle 21 at its upper end and wheels 22 at its lower end which are positioned between the flanges of a pair of channel tracks 24 inclined at a suitable angle to the floor of the chassis, on which the unit is mounted.

Figure 2:
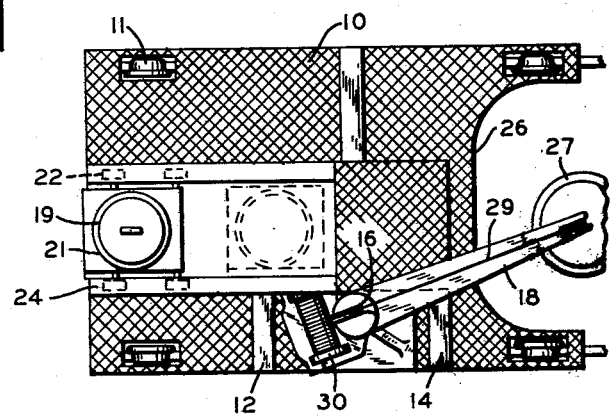
FIG. 2 is a top plan view thereof.

The chassis is formed with a recessed section shown at 26 (FIG. 2) to permit the unit to back up to a permanent insulated covering or heating pit 27 in which rests the capsule which has been filled with the charging material. While the capsule is in this pit, heat is applied by heating elements within the capsule, and the additive material is melted before the time of application, at which time a hook 28 at the outer end of a cable 29 on the crane is attached to the capsule which is raised by the crane winch 30 which may be electrically driven. The crane is then swung around to the left and the capsule deposited in the car 21 in its lowermost position. The latter may be raised and lowered on the channel tracks by means of a second electric winch 31 carrying a cable 32.

When loaded the car is elevated to the top of the tracks and the lance shown at 34 is attached below a valve 36 at the bottom of the capsule. A quick-acting union 37 may be used for effecting the connection. The lance is supported near the lower end of the tracks on a bracket with a pulley 38.

The chassis may now be moved into position against the furnace 39 adjacent the side opening 40 so that the lower end of the lance projects into the interior of the furnace, above the melt. By lowering the car down the tracks to a predetermined depth, the lance is quickly and accurately inserted into the melt so that its lower opening is exactly where the molten additive to be introduced will be most effective. The operator will open valve 36 as the lance enters the melt, and a small amount of the additive will flow into the melt while the lance is being lowered to its terminal position. The additive, being of a lower temperature than the melt, will act as a coolant for the lance while in the melt and, together with the usual carbon or similar sheathing, will increase the useful life of the lance.

In the modified form of the invention shown in FIG. 3 the trackway 44 for the car is adjustable as to its inclination so as to increase the flexibility of the unit. To that end the trackway is pivotally mounted on the chassis at its lower end at 45 and the upper end is attached to a hydraulic cylinder 48 pivoted at 50 on a vertical brace 14. This view also shows the insulated pre-heat pit 27 and the chassis may be backed up to the pit which would usually be located a short distance from the furnace. It will be noted in FIGS. 1 and 2 that the relationship between the axis of the crane mast is such that upon swinging the boom to the side opposite the crane mast, the capsule arrives at a position directly above the car receptacle 21 when the latter is in its lowermost position. Accordingly, if the opening in the furnace or other receptacle is such that the trackway must be lowered to the position of FIG. 3, this lowering will be done after the capsule has been deposited in the car.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. A mobile unit for lancing a molten mixture into a molten ferrous bath in a furnace formed with a side or top wall opening and comprising a chassis provided with wheels, a pair of channel tracks supported on the chassis at an angle of about 60° from the horizontal, a car movable up and down in said tracks, means on the car for supporting a capsule of molten material for conditioning the ferrous bath, the capsule having a bottom wall opening provided with a valve, an elongated lance leading upwardly to said capsule opening and a quick-operating fixture for securing the lance to said bottom wall below the valve, an anti-friction support for the lance at the lower end of the tracks to permit the lance to be accurately directed diagonally into said furnace opening, a crane lifting and lowering the capsule and for transferring the capsule from a pre-heat station into the car and later returning it to the pre-heat station and power driven means for operating the crane and for raising and lowering the car.

2. A mobile unit for lancing a molten mixture into a molten ferrous bath in a furnace formed with a side or top wall opening and comprising an elongated chassis provided with wheels, a pair of tracks supported on the chassis at a relatively steep angle from the horizontal, means for varying the angle of the tracks, a car movable up and down on said tracks and provided with a receptacle for a capsule to contain the molten material to be lanced into the ferrous bath and arranged to be carried in said receptacle, said capsule having a bottom wall opening provided with a valve, an elongated lance leading upwardly to said capsule opening through said valve and a quick-acting connector for securing the lance to said bottom wall below the valve, an anti-friction support for the lance at the lower end of the tracks to permit the lance to be freely directed diagonally into said furnace opening, a crane mounted adjacent to one longitudinal edge of the chassis for transferring the capsule from a pre-heat station into the car and power driven means for operating the crane and for raising and lowering the car.

3. A mobile unit of the character described and comprising a chassis provided with wheels, a pair of tracks supported on the chassis at less than a right angle from the horizontal, a car movable up and down in said tracks and supporting a capsule having a bottom wall opening provided with a valve, an elongated lance leading upwardly to said capsule opening and a quick-operating fixture for securing the lance to said bottom wall below the valve, a crane for transferring the capsule from a pre-heat station into the car and power driven means for operating the crane for raising and lowering the car.

References Cited in the file of this patent
UNITED STATES PATENTS

| | | |
|---|---|---|
| 905,948 | Strombarg | Dec. 8, 1908 |
| 1,043,036 | Smith | Oct. 29, 1912 |
| 1,549,141 | McGregor | Aug. 11, 1925 |